US008930596B2

(12) United States Patent
Heidelberger et al.

(10) Patent No.: US 8,930,596 B2
(45) Date of Patent: Jan. 6, 2015

(54) CONCURRENT ARRAY-BASED QUEUE

(71) Applicant: International Business Machines Corporation, Armonk, NY (US)

(72) Inventors: Philip Heidelberger, Cortlandt Manor, NY (US); Burkhard Steinmacher-Burow, Esslingen (DE)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 13/690,028

(22) Filed: Nov. 30, 2012

(65) Prior Publication Data

US 2014/0156959 A1    Jun. 5, 2014

(51) Int. Cl.
*G06F 3/00* (2006.01)
*H04L 12/28* (2006.01)
*G06F 12/14* (2006.01)
*G06F 12/06* (2006.01)

(52) U.S. Cl.
CPC ............ *G06F 12/14* (2013.01); *G06F 12/0646* (2013.01)

USPC ............................................. 710/56; 370/412

(58) Field of Classification Search
None
See application file for complete search history.

(56) References Cited

U.S. PATENT DOCUMENTS

2005/0169291 A1 * 8/2005 Key et al. ..................... 370/412

* cited by examiner

*Primary Examiner* — Hyun Nam
(74) *Attorney, Agent, or Firm* — Cantor Colburn LLP

(57) ABSTRACT

According to one embodiment, a method for implementing an array-based queue in memory of a memory system that includes a controller includes configuring, in the memory, metadata of the array-based queue. The configuring comprises defining, in metadata, an array start location in the memory for the array-based queue, defining, in the metadata, an array size for the array-based queue, defining, in the metadata, a queue top for the array-based queue and defining, in the metadata, a queue bottom for the array-based queue. The method also includes the controller serving a request for an operation on the queue, the request providing the location in the memory of the metadata of the queue.

21 Claims, 2 Drawing Sheets

CONCURRENT ARRAY-BASED QUEUE

This invention was made with Government support under contract B554331 awarded by United States Department of Energy. The Government has certain rights to this invention.

BACKGROUND

The present invention relates generally to computer systems, and more particularly to queues used in memory of a computer system.

Computer systems have continually evolving technology leading to increased performance and complexity in the systems. For example, systems with multiple processors and/or processors with multiple cores will lead to concurrent execution of a plurality of threads. Data structures, such as a queues, stacks and double ended queues ("deques") may be used to implement applications. A concurrent data structure, such as a concurrent queue, may be used concurrently by multiple users (e.g., threads). Concurrent operations on the data structure may be synchronized to ensure that the data in the structure is not corrupted by the operations. In some cases, an element in an array-based queue is a data object or a pointer to the data object that may be accessed by operations. For example, an application may have a plurality of threads, where a first thread stores an object in an element of the queue that is later loaded by a second thread from the queue for use in the application.

SUMMARY

According to one embodiment, a method for implementing an array-based queue in memory of a memory system that includes a controller includes configuring, in the memory, metadata of the array-based queue. The configuring comprises defining, in metadata, an array start location in the memory for the array-based queue, defining, in the metadata, an array size for the array-based queue, defining, in the metadata, a queue top for the array-based queue and defining, in the metadata, a queue bottom for the array-based queue. The method also includes the controller serving a request for an operation on the queue, the request providing the location in the memory of the metadata of the queue.

According to another embodiment, a system for implementing a queue is provided where the system includes a memory and a controller. The system is configured to perform a method that includes configuring an array-based queue in the memory. The configuring comprises defining, in metadata, an array start location in the memory for the array-based queue, defining, in the metadata, an array size for the array-based queue, defining, in the metadata, a queue top for the array-based queue and defining, in the metadata, a queue bottom for the array-based queue. The method also includes the controller serving a request for an operation on the queue, the request providing the location in the memory of the metadata of the queue.

DETAILED DESCRIPTION

Figure 1:
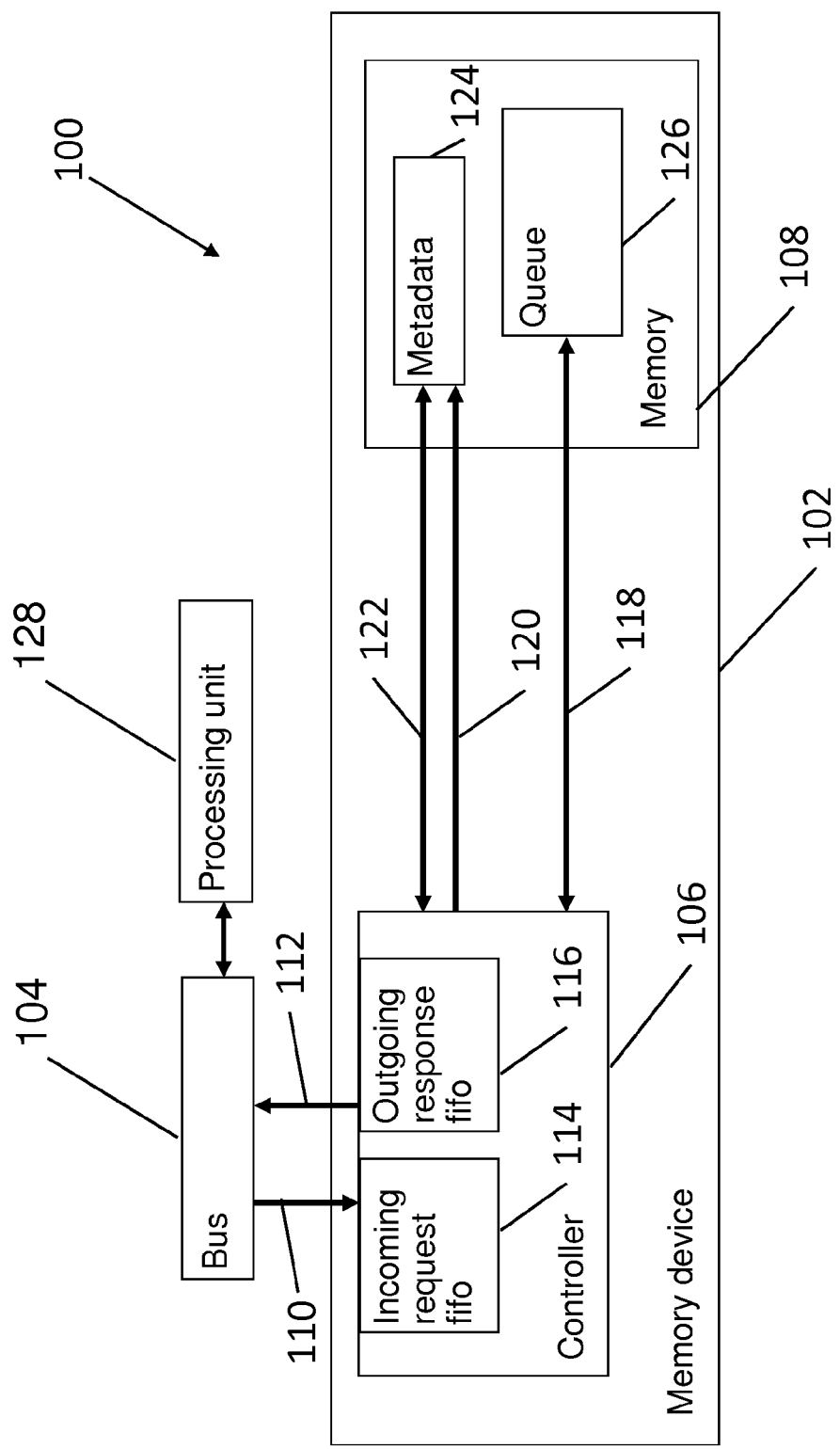
FIG. 1 illustrates block diagram of a memory system implementing a concurrent array-based queue in accordance with an embodiment.

An embodiment is directed to operating a memory system that includes a memory and a memory controller (also referred to herein as a "controller"). The memory may include any suitable memory device and in one embodiment includes one or more memory devices (e.g., random access memory "RAM" chips or cache) connected to the memory controller, and the memory controller is configured to control the memory. In an embodiment, the memory system is configured to implement a data structure, such as an array-based queue, using memory for the queue's data and metadata. The metadata includes parameters that define use of the array-based queue as a circular buffer holding the elements of the queue. Thus, because the queue's data and metadata is stored in memory, a user is able to create and configure many queues of arbitrary sizes, up to the limits of memory capacity. The user(s) configuring and utilizing the queue and metadata may be any suitable user of a queue in memory, including but not limited to a software application and a thread.

In an embodiment, the memory system implements new atomic memory operations (AMOs) to use the array-based queue. In embodiments, an AMO is a variation on a processor store or load instruction. An AMO request includes information identifying itself as such and specifying the desired operation. In an embodiment, a new processor store instruction is recognized and implemented by the memory system as a push AMO to a queue. In addition, a new processor load instruction is recognized and implemented by the memory system as a pop AMO from a queue. In one embodiment, the metadata stores the following queue parameters: array start location, array size, queue top and queue bottom. The array start location parameter points to the location for the start of the array in memory, while the array size describes the array's size in memory. The queue top points to the array element holding the top element of the queue, while the queue bottom points to the array element holding the bottom element of the queue. As discussed herein, the term "top" refers to the element at one end of the double-ended queue and the term "bottom" to refer to the element at the other end of the queue. In other cases, instead of top and bottom, the terms head and tail, respectively, or first and last, respectively, may be used.

In embodiments, an application utilizes the array-based queue as a double-ended queue, with the application requesting pushes and pops to both ends of the queue. In an embodiment, an application can use the queue as a last-in-first-out (LIFO) stack, by pushing to and popping from only one end of the queue. In one embodiment, an application may use the queue as a first-in-first-out (FIFO) producer-consumer queue, by pushing to one end and popping from the other end of the queue.

In embodiments, the queue is implemented by a single device as viewed from a user perspective, thus providing a single interface. In another embodiment, the queue is implemented by a plurality of devices, but provides a single device interface for communication with users. Thus, by having a single device interface manage the queue, operations requested by a plurality of users (i.e., concurrent operations) are simplified while instances of queue corruption are reduced. Specifically, as compared to other memory systems with multiple users, where each user implements own operation requests by directly accessing the queue elements and modifying the queue metadata, the queue may be corrupted when multiple users attempt concurrent operations on the queue. In such cases, corruption of the queue may occur unless application discipline coordinates the attempted concurrent operations. In such systems, this coordination prevents high performance (e.g., fast execution) concurrent operations on a queue. In an embodiment, improved performance for a concurrent queue is achieved by having a memory controller implement the operations on the queue. Therefore, performance is improved as compared to systems where the operations are implemented by users, for example by using software.

In an embodiment, concurrent computing occurs when an application includes a collection of interacting computational processes that may be executed in parallel. In an embodiment, concurrent items, users, programs, processes or threads can be executed on a single processor by interleaving execution steps of each concurrent item in a "time-slicing" way. In another embodiment, concurrent items, such as threads, can be executed in parallel by assigning each computational thread to one of a set of processors that may be close or distributed across a network. In order to execute concurrent threads properly, the controlling logic, such as operating systems or programs, are designed to ensure a correct sequencing of the interactions or communications between different threads, and also ensure coordinating access to resources that are shared among threads. In embodiments, the resource being shared by concurrent programs is any suitable resource, including but not limited to, a processor or a queue.

FIG. 1 illustrates a block diagram of a memory system 100 in accordance with an embodiment. The depicted memory system 100 includes a memory device 102 coupled to a bus 104, where the bus 104 is coupled to one or more processing units 128 that may issue requests to the memory device 102. Processing units 128 include, but are not limited to processors, network interface units or other direct memory access (DMA) devices, and/or higher-level caches. In an embodiment, the memory device 102 includes a controller 106 and memory 108. The controller 106 includes a receiver 114 and a transmitter 116 configured to communicate with the bus 104, where the receiver 114 and transmitter 116 each include first-in-first-out buffers (FIFOs). The controller 106 (also referred to herein as a "memory controller") serves read and write accesses to the memory 108. The memory 108 is any suitable physical memory, such as cache or random access memory (RAM). In an embodiment, metadata 124 and an array-based queue 126 are configured within memory 108 by a user, where the metadata 124 stores parameters that describe and define the queue. In an embodiment, the memory system 100 implements a queue by having the controller 106 serve a request 110 for an operation on the queue 126. When serving such a request 110, the controller 106 may read and update the metadata 124 and the queue 126.

In an embodiment, a request 110 for an operation on the queue 126 is served by the controller 106. A request 110 from a requestor or user is received from the bus 104 by the receiver 114 of the controller 106. The requestor may be a thread executing an application. The request 110 may be any suitable request for an operation on the queue 126, such as a "store-like" push request that allocates a top or bottom element and stores a value there. In an embodiment, the request 110 may be a "load-like" pop request that loads and removes the top or bottom element of a queue. In embodiments, a memory load or store request provides an address location to be accessed. In an embodiment, the request 110 provides the address location of the metadata 124 for the queue for an operation in the request. The metadata 124 is read by the controller 106 to determine queue parameters, as shown by communication 122. The queue parameters provided by the metadata 124 include, but are not limited to, the array start location, array size, queue top and queue bottom. These parameters are used by the controller 106 to determine a location in memory 108 for a selected element in the array-based queue 126, where the selected element is used by the request 110. In communication 120, the controller 106 updates the metadata 124 according to the queue operation being served.

In embodiments, the request 110 may be a push to or pop from the top of the queue. In embodiments serving the request 110 for the top of the queue, the controller 106 updates, in communication 120, the top parameter in the metadata 124. In another embodiment, the request 110 may be an operation on the bottom of the queue. Accordingly, in communication 120, the controller 106 updates the bottom parameter in the metadata 124. For a pop top or a pop bottom operation, the update of the metadata 124 advances the top or bottom to remove the selected element from the top or bottom of the queue, respectively. For a push top or a push bottom operation, the metadata update advances the top or bottom to add the selected element to the top or bottom of the queue, respectively. A queue element may be accessed by the controller 106 in communication 118, where the accessing is based on the operation in request 110. In an embodiment where the request 110 is a pop operation, then the value of the selected element read in communication 118 is transmitted by the controller 106 to the user in the reply 112. In an embodiment where the request 110 is a push operation, then the request 110 provides a value which the controller 106 writes in communication 118 to the selected element.

Figure 2:
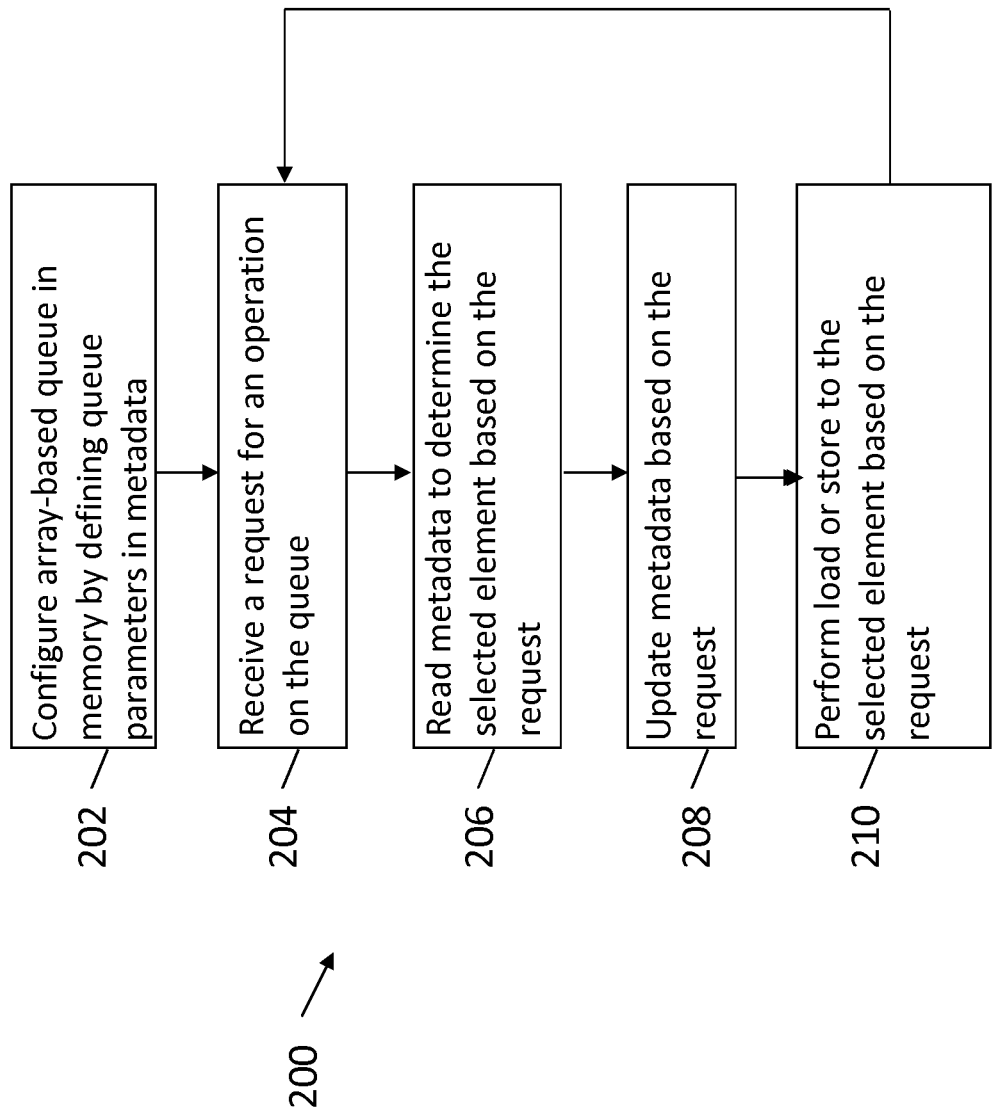
FIG. 2 illustrates a flow diagram of a memory system implementing a concurrent array-based queue in accordance with an embodiment.

FIG. 2 is a flow chart of an exemplary method and system for operating a memory system, such as the memory system shown in FIG. 1. In embodiments, the steps may be served or performed by a controller, such as a memory controller, higher level cache and/or processor(s). In block 202, an array-based queue is configured in memory by a user, where the configuring includes defining queue parameters in metadata stored in the memory alongside the queue. The queue parameters in metadata are received from a user. In an embodiment, the metadata parameters include an array start location, an array size, a queue top and a queue bottom. In embodiments, a position of the queue in memory is defined by the array start location and array size, and the queue top and bottom information changes as values are pushed to and popped from the queue top and bottom. In embodiments, the configuration block 202 is performed once by the application to initially configure the queue and its metadata. The initial configuration block 202 may be performed once during initial configuration, while blocks 204 to 210 may be repeated when each request for an operation is served by the controller 106. In block 204, a request for an operation on the queue from a user or requestor is received by the memory controller. The request 110 provides the address location of the metadata 124 for the queue for the operation. In an embodiment, the request is a push request or pop request for an element at the top or bottom of the queue. In embodiments, the requestor issuing the request can be any suitable user, such as a thread running on a processor, a processing element included in a buffered memory stack or a thread communicating over a network via network interface logic.

In block 206, the controller reads the metadata to determine the location in memory for the selected element based on the received request. In an embodiment, for a push request to the queue top (i.e., a push top request), the queue top is read by the controller to determine a location for loading the queue top value based on the request. In block 208, the controller updates the metadata based on the request. In an embodiment where a pop top request or a pop bottom request is served, the update advances the queue top or queue bottom, respectively, to remove the selected element to the queue. In an embodiment where a push top request or a push bottom request is served, the update advances the queue top or queue bottom, respectively, to add the selected element to the queue. In block 210, the controller loads (i.e., reads) from or stores (i.e., writes) to the determined location in memory based on the request, where the requested operation is a pop or push of a value, respectively. In an embodiment with a pop top or pop bottom operation, the controller reads the selected element from the specified location based on the request and replies to the request with the result of the read operation. In an embodiment with a push top or push bottom operation, the controller writes a value provided by the push request to the selected element in the queue. As shown in the diagram, following block 210, the controller waits to serve the next request 110 and returns to block 204.

Illustrated below is a pseudocode description of the metadata of a concurrent array-based queue implemented in a memory system in accordance with an embodiment. The pseudocode shown below illustrates embodiments of the systems, methods and computer-program products that are described in FIGS. 1-2.
// Comment: Pseudocode description of metadata 124.

```
struct metadata {
    size;          // The number of array elements. User will initialize.
    start[size];   // The array holding queue 126. User will initialize.
    top    = (2^62)-1; // Initialize empty queue, with a top and bottom
    bottom = (2^62);   // that will not reach overflow nor underflow.
}
```

Illustrated below is a pseudocode description of the actions of a memory controller serving a request for a pop top operation on a concurrent array-based queue implemented in a memory system in accordance with an embodiment.
// Comment: Pseudocode actions of a controller 106 serving a popTop request 110.

```
popTop(metadata m) {
    // metadata 124 at address m is read in communication 122,
    block 206.
    if (m.top<m.bottom) return EMPTYQUEUE; // Reply 112.
    indexTop = m.top modulo m.size;    // Use array as circular-buffer.
    --m.top;                            // top update 120, block 208.
    reply = m.start[indexTop];          // Communication 118, block 210.
    return reply;                       // Reply 112.
}
```

Illustrated below is a pseudocode description of the actions of a memory controller serving a request for a push top operation on a concurrent array-based queue implemented in a memory system in accordance with an embodiment.
// Comment: Pseudocode actions of a controller 106 serving a pushTop request 110.

```
pushTop(metadata m, value) {
    // metadata 124 at address m is read in communication 122,
    block 206.
    if (m.bottom+m.size<m.top+2) return; // Fail on push to full queue.
    indexTop = m.top modulo m.size;    // Use array as circular-buffer.
    ++m.top;                            // top update 120, block 208.
    m.start[indexTop] = value;          // Communication 118, block 210.
    return;
}
```

With reference back to FIG. 1, in an embodiment, the request 110 corresponds to a single load instruction or a single store instruction. Accordingly, the request 110 is an atomic memory operation (AMO) received and served by the controller 106. In the embodiment with the memory system 100 supporting concurrent load instructions and store instructions, the memory system supports concurrent requests for operations on a queue. The embodiment provides improved usability of a queue with low hardware and software overhead, for example with a multi-threaded application where multiple threads concurrently issue requests, such as the request 110. In embodiments, multiple requests by one or more threads or other users may attempt to access the same metadata 124 and corresponding queue 126. In other embodiments, multiple requests may be to different queues. Because an AMO corresponds to a single processor load or store instruction, it provides improved integrity for concurrent use of the queue. In an embodiment where a push or a pop request corresponds to multiple processor instructions, concurrent use of the queue would require organization of the instructions. Embodiments of the queue implementation provide a single interface for a plurality of users or threads to utilize the queue. The atomic nature of the controller 106 satisfies each request 110 to use the queue and avoids corruption of queue data that may occur with multiple threads accessing the queue. Thus, in an embodiment, a concurrent array-based queue is provided that improves data integrity and access to a plurality of users. Further, the queue implementation and management appears as a single interface to the plurality of users to prevent users from interfering with queue data that is being accessed by another user.

In an embodiment, the metadata includes additional information relating to the queue 126. The metadata may include a parameter which defines the element size for the elements of an array-based queue. Further, a metadata parameter may enable/disable an indication of an error condition, such as raising an interrupt when the pop or push request 110 specifies an element size smaller or larger, respectively, than that defined in the metadata 124. In an embodiment, the request from the user may include an element size accompanying the load or store instruction underlying a pop or push operation of the request. Thus, the element size may be a part of the request from the user. An application making efficient use of its memory capacity may define an element size that does not correspond to a push or pop size. For such a request 110, the upper bits of the value may be dropped. In embodiments, a metadata parameter may enable or disable the interrupt to be raised when the dropped bits have a non-zero value.

In embodiments, suitable information used to manage the queue 126 may be stored in the metadata 124. In an embodiment, the metadata includes a failed pop parameter, where the failed pop parameter is a value in the reply 112 returned by the controller 106 to the user when a pop request is received for a queue that is empty. The failed pop parameter allows the user to configure a value to indicate failure, where the value does not match any possible valid values that the user may attempt to push to the queue. In embodiments, a metadata parameter may enable or disable an interrupt to be raised if a push operation attempts to store the failed pop parameter to the queue, thus preventing an erroneous indication that the queue is empty when the element is subsequently popped.

In an embodiment, the metadata 124 describing the queue 126 includes a token parameter, where a token allows the user to reserve a space for a subsequent push to the queue and thus avoid an attempt to push to a full queue. The token parameter represents the number of free and unreserved spaces (i.e., the number of tokens available) available for future pushes to the queue. In an embodiment, when serving a pop request 110, the controller 106 increments the token parameter. When serving a push request 110, the controller 106 does not change the token parameter. A user uses an AMO load request 110 to attempt to obtain a token and thus reserves a space for a future push. On serving the AMO load request 110, if the token parameter is greater than zero, the controller 106 decrements the token parameter and the reply 112 indicates to the user that a token has been obtained. Otherwise, the token parameter is zero and the controller's reply 112 indicates to the user that no token has been obtained. In embodiments, an AMO load request 110 could attempt to obtain multiple tokens. A corresponding AMO store request 110 allows a user to return one or more unused tokens. On serving the AMO store, the controller 106 increments the token parameter in the metadata 124. In the embodiment, the user obtains a token before issuing a push request 110. In an embodiment, the metadata could have a pop token parameter which allows a user who successfully acquires a pop token to ensure that a future pop request 110 succeeds, since a user cannot acquire a pop token with an empty queue. By definition, the pop token parameter represents the number of unreserved full elements in the queue. Accordingly, if a queue is empty, a pop token will not be available to a user. This avoids the need for an out-of-band value in the reply 112 to indicate a failed pop from an empty queue.

In an embodiment, the push AMO request 110 is based on the processor's store-conditional instruction, where the condition included in the reply 112 indicates to the user if the push succeeded. In yet another embodiment, the push AMO request 110 is based on the processor's swap or compare-and-swap instruction where the value in the reply 112 indicates to the user if the push succeeded. Accordingly, the above embodiments avoid the need for the token use and support described in the previous paragraph. In some cases, however, the embodiments with push AMO requests 110 based on store-conditional or swap instructions may adversely affect performance, due to the stall of a user thread waiting for the push's return condition or value in the reply 112. In contrast, a push AMO request 110 based on the processor's store instruction has no reply 112 and thus does not stall the user thread, but uses tokens or other user discipline to avoid attempts to push to a full queue.

In one embodiment, the metadata 124 includes a configuration lock parameter that indicates that the metadata and its queue are being configured by a user and thus unavailable to other users. An AMO load request 110 sets the configuration lock and grants the configuration lock at most once, with the value of the reply 112 received by the user indicating whether the user successfully acquired the configuration lock or not. In an embodiment where the lock is set, the configuration lock causes the controller 106 to not successfully serve a request 110 to the queue. In embodiments, the user may write to the metadata to unlock the configuration lock and make the queue available. In an embodiment, on encountering a full queue, a user may acquire the lock and then the empty the queue by reconfiguring the metadata to use a different array in memory and, subsequently, unlock the queue to make it available to users. In another embodiment, a queue may be initially locked where the queue's array holds valid elements. When a defined condition is encountered, a user configures the metadata to make the array elements available via the queue, and then unlocks the queue, thus making the array elements available to users of the queue.

In an embodiment, a page size and alignment for any request 110 is defined in a kernel protected field in the controller 106, where the kernel protected field cannot be modified by users. For the request 110, the controller 106 determines if the metadata 124 and the array-based queue 126 are entirely located within the same memory page. The controller 106 successfully serves the request only if the metadata and the queue are within the same page. Otherwise, the controller 106 may provide a reply 112 which indicates the error to the user and, additionally, the controller 106 may raise an error condition, such as raising an interrupt. In embodiments, a request 110 corresponds to a load or store to the metadata 124 address. Thus, a request 110 reaching the controller 106 implies that the operating system (OS) has configured the processor memory address translation hardware to allow a user to access that page in memory. The page size in the kernel protected field therefore prevents a user from inadvertently or maliciously configuring the metadata, such that a request 110 would cause access to another user's memory. In an embodiment, the controller 106 has a configurable table where each row contains a memory page size and is indexed by OS-settable user defined bits in the translation hardware that accompany the real address of a request 110 to the memory controller. In an embodiment, the kernel-protected field specifying the page size and alignment is a kernel-protected operand in the request 110, where the operand is provided by the processor memory address translation hardware. For page sizes which are power of 2, as are typically used in processor memory address translation hardware, an operand using 5 bits can indicate page sizes up to 2 to the power of the number of bits (2 to the power of 5), i.e., $2^{32}$ bits or 4 gigabytes.

Other queue features may also be implemented in embodiments of the memory system and method. One embodiment includes a controller serving additional load AMO request 110 types that reply 112 with a value for: the free space in the queue, the total number of elements pushed into queue, and the number of elements popped from the queue. The implementation may use additional counter parameters in the metadata to provide these features. On serving the load AMO request 110, the controller 106 may clear the counter. In addition, on a user-configurable queue event, the controller 106 can raise a signal from the memory system to a processor interrupt unit, wakeup unit, counter or other device. Additional parameters in the metadata 124 configure each event and corresponding status bits record the occurrence of an event. In embodiments, the events include a high-water or low-water signal when the number of elements in the queue exceeds a threshold count configured in the metadata corresponding to a high-water or low-water value, and a signal when any packet is pushed or popped from the queue.

An embodiment of the controller 106 may support a peek request 110 (top or bottom), with the corresponding reply 112 returning the value of a queue element, but leaving the element at the top or bottom of the queue. In one embodiment, a user-configurable metadata 124 parameter forces a push request 110 to a full queue to overwrite the corresponding old element at that location in the array-based queue 126. In a case of a queue with no pop requests, the queue contains only the most recently pushed elements.

In an embodiment, an element on the queue may serve multiple pop requests by having an element on the queue represent multiple instances of itself, where each instance is consecutively numbered in an instance field. Metadata parameters define the position and size of an instance field in each element of the queue. A pop request 110 includes information specifying whether or not it is a pop instance request. At the end of serving a pop request, the controller determines if the request was a pop instance request. If the request is a pop instance request, then the controller 106 decrements the instance field of the selected element and if the result is greater than zero, then the controller pushes the element with its updated instance value back onto the queue. In embodiments, the instance field acts as a counter indicating occurrences of a pop request.

A queue feature may include an indirect push request 110, where the push gives the address of a value instead of the element value. The controller may copy the value from the address to the queue. Similarly, an indirect pop request 110 may utilize an address for a value where the controller copies the value from the queue element to the address. A queue feature may include variable-sized elements within a queue where inside each element, at fixed offset from start and/or end, a size field is located. The controller reads a queue element's size field to update the queue's top or bottom parameter in the metadata 124. Metadata parameters can describe the position and size of the size field in an element. Another queue feature may include metadata 124 with parameters for multiple queues 126, where each queue has its an own array, where the multiple queue feature allows a successful push and pop request 110 to metadata 124, even if one of the array-based queues 126 is full or empty or being configured.

The memory system 102 may be a level in a cache hierarchy, so that the controller 106 serving a queue request 110 may result in memory system 102 access to lower level(s) in the cache hierarchy to establish the metadata 124 and queue 126 in memory cache 108. A memory system may be split into two or more parts, where a controller in a part may serve a queue using memory 108 in that part. In another embodiment, a cache level may be replicated as two or more units, where the controller may access any part of the underlying cache or memory levels within a cache unit.

An embodiment of the memory system includes one or more active buffered memory device. The active buffered devices may include a plurality of memory elements (e.g., chips) connected to a logic portion and a processing element. In an embodiment, the active buffered memory device includes layers of memory that form a three dimensional ("3D") memory device where individual columns of chips form vaults in communication with the processing element and logic. The memory device may include a plurality of processing elements configured to communicate to the chips and other processing elements in the memory system. In some embodiments, the active buffered memory device may comprise partitions that may be concurrently accessed by a plurality of processing elements, where the partitions may be any suitable memory segment, including but not limited to vaults. In an embodiment, a processing element accesses a selected address in a partition through an interconnect network. In one embodiment, a processing element may act as the requestor described above, thus utilizing the queue 126 and associated metadata 124 to implement an application.

Embodiments include a memory stack with a processing element and memory controller in the hub chip, referred to as an active buffered memory device. The active buffered memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor. In one example, a processing element or a main processor may act as the requestor described above, thus utilizing the metadata to serve the queue.

In an embodiment, the active buffered memory device is configured to load configuration information or instructions from a part of the active buffered memory device into a processing element following receiving a command from an external requestor, such as a main processor or another processing element. In addition, the processing element may perform virtual-to-real address translations that it computes while executing the loaded instructions.

In embodiments, it is desirable to have processing capabilities within an active buffered memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active buffered memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing an array-based queue in memory of a memory system that includes a controller, the method comprising:
    configuring, in the memory, metadata of the array-based queue, the configuring comprising:
        defining, in the metadata, an array start location in the memory for the array-based queue;
        defining, in the metadata, an array size for the array-based queue;
        defining, in the metadata, a queue top for the array-based queue; and
        defining, in the metadata, a queue bottom for the array-based queue; and
    serving, by the controller, a request for an operation on the queue, the request providing the location, in the memory, of the metadata of the queue,
        wherein the request corresponds to a single load instruction or a single store instruction wherein the single load or single store instruction comprises an atomic memory operation received and served by the controller and the single load or single store instruction supports concurrent requests.

2. The method of claim 1, wherein serving the request further comprises:
receiving the request, the request comprising a pop top operation request or a pop bottom operation request;
reading the metadata to determine a location in memory for a selected element in the array-based queue based on the request;
updating the metadata based on the request, the updating comprising advancing the queue top or the queue bottom to remove the selected element from the array-based queue;
reading the selected element based on the request; and
replying to the request with a result of the read.

3. The method of claim 2, wherein the configuring the array-based queue further comprises defining, in the metadata, a failed pop parameter to be returned by the controller when receiving a pop request for the array-based queue when the array-based queue is empty.

4. The method of claim 2, wherein the configuring further comprises defining, in the metadata, a position and size of an instance field in each element of the array-based queue, the request comprises a pop instance request, and wherein the serving further comprises decrementing an instance field of the selected element and pushing the selected element with an updated instance field back onto the array-based queue based on the result being greater than zero.

5. The method of claim 1, wherein serving the request further comprises:
receiving the request, the request comprising a push top or push bottom operation request on the queue, the request providing a value for a selected element in the array-based queue;
reading the metadata to determine a location in memory for the selected element in the array-based queue based on the request;
updating the metadata based on the request, the updating comprising advancing the queue top or the queue bottom to add the selected element to the queue; and
writing the value provided by the request to the selected element.

6. The method of claim 1, the configuring further comprising defining, in the metadata, a token parameter that represents a number of free elements available for future pushes to the queue and wherein updating the metadata based on the request comprises updating the token parameter.

7. The method of claim 1, further comprising defining a kernel-protected field in the controller that specifies a page size and an alignment of a memory page, wherein the controller successfully serves the request only if the metadata and the array-based queue are located at a same page.

8. The method of claim 7, wherein the kernel-protected field specifying the page size and alignment is a kernel-protected operand in the request and the kernel-protected operand is provided by processor memory address translation hardware.

9. The method of claim 1, wherein the configuring further comprises defining, in the metadata, a configuration lock parameter to indicate if the array-based queue is being configured, wherein a request can acquire a configuration lock using the configuration lock parameter and acquiring the configuration lock prevents the controller from successfully serving subsequent requests to the queue.

10. A system for implementing a queue, the system comprising:
a memory and a controller, the system configured to perform a method comprising:
configuring, in the memory, metadata of an array-based queue, the array-based queue located in the memory, wherein configuring comprises:
defining, in the metadata, an array start location in the memory for the array-based queue;
defining, in the metadata, an array size for the array-based queue;
defining, in the metadata, a queue top for the array-based queue; and
defining, in the metadata, a queue bottom for the array-based queue; and
serving, by the controller, a request for an operation on the queue, the request providing the location, in the memory, of the metadata of the queue,
wherein the request corresponds to a single load instruction or a single store instruction, wherein the single load or single store instruction comprises an atomic memory operation received and served by the controller and the single load or single store instruction supports concurrent requests.

11. The system of claim 10, wherein serving the request further comprises:
receiving the request, the request comprising a pop top operation request or a pop bottom operation request;
reading the metadata to determine a location in memory for a selected element in the array-based queue based on the request;
updating the metadata based on the request, the updating comprising advancing the queue top or the queue bottom to remove the selected element from the array-based queue;
reading the selected element based on the request; and
replying to the request with a result of the read.

12. The system of claim 10, wherein serving the request further comprises:
receiving the request, the request comprising a push top or push bottom operation request on the queue, the request providing a value for a selected element in the array-based queue;
reading the metadata to determine a location in memory for the selected element in the array-based queue based on the request;
updating the metadata based on the request, the updating comprising advancing the queue top or the queue bottom to add the selected element to the queue; and
writing the value provided by the request to the selected element.

13. The system of claim 10, further comprising defining a kernel-protected field in the controller that specifies a page size and an alignment of a memory page, wherein the controller successfully serves the request only if the metadata and the array-based queue are located at a same page.

14. The system of claim 13, wherein the kernel-protected field specifying the page size and alignment is a kernel-protected operand in the request and the kernel-protected operand is provided by processor memory address translation hardware.

15. The system of claim 10, wherein the configuring further comprises defining, in the metadata, a configuration lock parameter to indicate if the array-based queue is being configured, wherein a request can acquire a configuration lock using the configuration lock parameter and acquiring the configuration lock prevents the controller from successfully serving subsequent requests to the queue.

16. A computer program product for implementing an array-based queue in memory of a memory system, the memory system including a controller, the computer program product comprising:
- a non-transitory storage medium readable by a processing circuit and storing instructions for execution by the processing circuit for performing a method comprising:
- configuring, in the memory, metadata of the array-based queue, wherein configuring comprises:
  - defining, in the metadata, an array start location in the memory for the array-based queue;
  - defining, in the metadata, an array size for the array-based queue;
  - defining, in the metadata, a queue top for the array-based queue; and
  - defining, in the metadata, a queue bottom for the array-based queue; and
- serving, by a controller, a request for an operation on the queue, the request providing the location, in the memory, of the metadata of the queue,
- wherein the request corresponds to a single load instruction or a single store instruction, wherein the single load or single store instruction comprises an atomic memory operation received and served by the controller and the single load or single store instruction supports concurrent requests.

17. The computer program product of claim 16, wherein serving the request further comprises:
- receiving the request, the request comprising a pop top operation request or a pop bottom operation request;
- reading the metadata to determine a location in memory for a selected element in the array-based queue based on the request;
- updating the metadata based on the request, the updating comprising advancing the queue top or the queue bottom to remove the selected element from the array-based queue;
- reading the selected element based on the request; and
- replying to the request with a result of the read.

18. The computer program product of claim 17, wherein the configuring the array-based queue further comprises defining, in the metadata, a failed pop parameter to be returned by the controller when receiving a pop request for the array-based queue when the array-based queue is empty.

19. The computer program product of claim 17, wherein the configuring further comprises defining, in the metadata, a position and size of an instance field in each element of the array-based queue, the request comprises a pop instance request, and wherein the serving further comprises decrementing an instance field of the selected element and pushing the selected element with an updated instance field back onto the array-based queue based on the result being greater than zero.

20. The computer program product of claim 16, wherein serving the request further comprises:
- receiving the request, the request comprising a push top or push bottom operation request on the queue, the request providing a value for a selected element in the array-based queue;
- reading the metadata to determine a location in memory for the selected element in the array-based queue based on the request;
- updating the metadata based on the request, the updating comprising advancing the queue top or the queue bottom to add the selected element to the queue; and
- writing the value provided by the request to the selected element.

21. The computer program product of claim 16, the configuring further comprising defining, in the metadata, a token parameter that represents a number of free elements available for future pushes to the queue and wherein updating the metadata based on the request comprises updating the token parameter.

* * * * *